(12) United States Patent
Tsukuda et al.

(10) Patent No.: US 6,514,546 B2
(45) Date of Patent: Feb. 4, 2003

(54) EASILY DISPERSIBLE GRANULES OF SOYBEAN PROTEIN AND METHODS FOR PREPARING THE SAME

(76) Inventors: Koji Tsukuda, 4-6, Isonokami-Cho 5-Chome, Kishiwada-shi, Osaka-Fu (JP), 596-0001; Yasuhiro Hoshii, 22-9, Fujigaoka 4-Chome, Fujiidera-shi, Osaka-Fu (JP), 583-0017; Thomas V. Gottemoller, 1565 Alexander Dr., Mt. Zion, IL (US) 62549

( * ) Notice: Subject to any disclaimer, the term of this patent is extended or adjusted under 35 U.S.C. 154(b) by 0 days.

(21) Appl. No.: 09/860,283

(22) Filed: May 18, 2001

(65) Prior Publication Data

US 2002/0146487 A1 Oct. 10, 2002

Related U.S. Application Data

(63) Continuation-in-part of application No. 09/773,656, filed on Jan. 31, 2001.

(51) Int. Cl.[7] .............................. A23L 1/48; A23L 1/20; A23J 1/14
(52) U.S. Cl. ......................... 426/89; 426/656; 426/634; 426/93
(58) Field of Search ........................ 426/89, 656, 634, 426/93

(56) References Cited

U.S. PATENT DOCUMENTS

| 4,608,203 A | * | 8/1986 | Akasaka et al. |
| 6,045,849 A | * | 4/2000 | Ariga et al. |
| 6,096,343 A | * | 8/2000 | Gergely et al. |

FOREIGN PATENT DOCUMENTS

EP 787437 * 6/1997

* cited by examiner

Primary Examiner—Anthony J. Weier
(74) Attorney, Agent, or Firm—Sterne, Kessler, Goldstein & Fox P.L.L.C.

(57) ABSTRACT

An easily dispersible granule of soybean protein comprises powdery soybean protein whose surface is coated with a carbohydrate, which is not readily digestible, wherein the carbohydrate is present in an amount of at least 5 parts by weight per 100 parts by weight of the powdery soybean protein. A method for preparing such an easily dispersible granule of soybean protein in which powdery soybean protein is granulated while the powder is sprayed with an aqueous solution containing a carbohydrate which is not readily digestible and which is characterized by using at least 5 parts by weight of the hardly digestible carbohydrate per 100 parts by weight of the powdery soybean protein is also disclosed. An Alternative method involves spraying a dry mix of soybean protein and not readily digestible carbohydrate with lecithin in water, and removing the water from the resultant lecithin-coated mix.

4 Claims, No Drawings

EASILY DISPERSIBLE GRANULES OF SOYBEAN PROTEIN AND METHODS FOR PREPARING THE SAME

This application is a continuation-in-part of prior copending application Ser. No. 09/773,656, filed on Jan. 31, 2001.

FIELD OF THE INVENTION

The present invention relates to an easily dispersible granule of soybean protein and methods for the preparing thereof.

BACKGROUND OF THE INVENTION

Protein is a nutrient component essential for, among other things, the formation and maintenance of muscle. It has generally been said that athletes should ingest protein in an amount ranging from 1.5 to 2.0 g/kg body weight per day in order to reinforce the muscles and to enhance their stamina, although the amount varies depending on their age and living environment (RINSHO EIYO (Clinical Nutrients), 1992, Vol. 80, No. 5, pp. 495–502). More specifically, in case of a player whose body weight is 70 kg, it is necessary to take about 120 g of proteins per day. However, if such a large amount of protein is taken as the usual diet, the total amount of the diet is considerably increased. As a result, it would be painful for players to take a meal and he should be in excess training for preventing any accumulation of excess calorie as fats in the body. This may in turn become a cause of damage or shorten the life of the player.

In addition, it is well known and understood that protein is a nutritional requirement for all living things. While non-athletes may not require as high levels of protein in the diet as do athletes, protein from various sources is a necessary part of the diet for all of the earth's population.

For these reasons (and others), protein can be, and sometimes should be, supplemented from a source other than the usual meal, and accordingly, it has been planned to solve the foregoing problem by making use of a protein-supply food having a high protein content. A variety of proteins can be used as those for the protein-supply food, but it is one of the mainstreams to use milk proteins and soybean proteins since they are particularly high quality proteins. In particular, the soybean proteins have become of major interest lately because of their low price.

Moreover, in recent studies (for instance, Federal Register, 64 FR 57699, Oct. 26, 1999 (Food Labeling: Health Claim: Soy Protein and Coronary Heart Disease: Final Rule)), it is reported that a protein intake of 25 g per day would show such effects as the reduction of the cholesterol content and the reduction of any risk of suffering from heart diseases. Therefore, the efficacy of the soybean protein has increasingly attracted the interest of not only athletic sports players, but also healthy persons.

As foods capable of providing such soybean protein, there have been investigated liquid foods such as soybean milk. However, the smell peculiar to the soybean milk sometimes becomes a problem, and these liquid foods also suffer from a problem of storability and portability. For this reason, it has recently become desirable to move from such liquid foods to powdery soybean protein, which can easily be handled.

The powdery soybean protein may directly be ingested, but this is not common since it does not easily pass through the throat. It may likewise be possible to first disperse the powdery soybean protein in a liquid such as water or milk and then drink the resulting dispersion in order to make the intake thereof. However, the powdery soybean protein is in a fine particulate condition and if it is added to a liquid, it suspends on the surface of the liquid to thus form the so-called "DAMA" (lumps or masses). The phenomenon of this "DAMA" cannot easily be eliminated by simply stirring with, for instance, a spoon. In other words, it is impossible to make the powdery soybean protein drinkable simply by introducing it into a liquid and then subjecting the mixture to simple stirring. Moreover, it is possible to convert the powdery soybean protein into a condition approximately similar to a drinkable liquid by intensively stirring such a mixture using a high speed-stirring machine such as a homogenizer, but this method is not generally performed. Even if the powdery soybean protein is forced to disperse in a liquid using such a method, the resulting dispersion is improved in the palatability and the ability to pass through the throat, but such problems as the smell peculiar to the soybean, a bitter taste thereof, a harsh taste and astringency are not solved. Therefore, people are often reluctant to drink such dispersions.

Conventionally, powdery soybean protein has been prepared by spray-drying an aqueous solution of soybean protein per se, or after adding lecithin to the aqueous solution. However, the soybean protein products prepared according to these methods still suffer from the foregoing problems.

Other various methods for preparing powdery soybean protein products have been reported, but none of them solve all of the foregoing problems. For instance, Japanese Un-Examined Patent Publication No. Hei 8-131083 discloses soybean protein powder prepared by blending or mixing an aqueous solution containing soybean protein for preparing solidified soybean protein foods such as bean curd with a polyglycerin fatty acid ester comprising a fatty acid having 8 to 18 carbon atoms and a polyglycerin having a degree of polymerization ranging from 4 to 10, and then drying the resulting mixture. In the foregoing method for preparing soybean protein powder, a synthetic surfactant is used instead of lecithin, which is a naturally occurring surfactant conventionally used to improve the dispersibility of the soybean protein. This method would permit the improvement of the dispersibility, but does not address taste and/or palatability issues. In addition, Japanese Un-Examined Patent Publication No. Hei 8-131083 also discloses that the dried soybean protein powder may be granulated or formed into granules while using a binder such as sucrose, lactose, trehalose, dextrin or carboxymethyl cellulose. Such granulation would permit the improvement of the dispersibility in, for instance, water. However, this procedure cannot solve all of the problems concerning the smell, bitter taste, harsh taste and astringency peculiar to the soybean.

Furthermore, Japanese Un-Examined Patent Publication No. Hei 9-275911 discloses a powdery soybean protein product prepared by adding 2 to 40 parts by weight of starch hydrolyzate having a DE of 5 to 30 per 100 parts by weight of the solid content of an aqueous solution containing soybean protein components and then drying the resulting mixture. In this invention, the starch hydrolyzate having a DE of 5 to 30 is dispersed throughout the particles to thus improve the dispersibility of the soybean protein components in a liquid. However, if the added amount of the starch hydrolyzate is insufficient, it takes a long period of time to completely disperse the soybean protein components in a liquid. On the other hand, if the added amount of the starch hydrolyzate is increased to ensure rapid dispersion thereof, the concentration of the soybean protein is reduced. Moreover, this method shows an effect of masking, for instance, the smell of soybean in the liquid to some extent, but it is insufficient in the effect of improving astringency and rough feeling of the product.

In addition, Japanese Un-Examined Patent Publication No. Hei 8-154593 proposes a method for preparing a soybean protein material comprising the steps of hydrolyzing an aqueous system containing soybean protein to a rate of hydrolyzing ranging from 5 to 20, adding 5 to 50 parts by weight of fats and oils to 100 parts by weight of the soybean protein before or after the hydrolysis to form an emulsion, preferably dispersing an emulsifying agent, and drying the resulting emulsion. In this example, the decomposition of the protein and the addition of fats and oils permits the improvement of the dispersibility and taste and texture and the resulting product is suitable for use in making concentrated liquid such as soup and pickle liquids. However, if fats and oils are added in such an amount that the smell, bitterness, harsh taste and astringency are replaced with the taste and texture of the fats and oils, the content of protein is reduced and therefore, the product is unfavorable as a protein-supply food.

Furthermore, there has been proposed a method for the preparation of powdery soybean protein, which makes use of granulation. For instance, Japanese Un-Examined Patent Publication No. Hei 6-113749 discloses a method for fluidized bed-granulation, which comprises the step of granulating raw soybean protein powder while spraying the raw soybean protein powder with water or a water-containing liquid comprising, as a surfactant, a glycerin fatty acid ester, sorbitan fatty acid ester, propylene glycol and/or sucrose fatty acid ester. This method permits the improvement of the dispersibility of the resulting soybean protein powder, but does not solve the problems concerning the smell of soybean and taste. In addition, if the added amount of such a surfactant increases, the surfactant may adversely affect the taste of the resulting product.

Japanese Un-Examined Patent Publication No. Hei 9-215486 (BASIC EP 78437A) discloses a method for preparing a granular food comprising the steps of mixing a powdery raw material rich in carbohydrate and/or proteins with fats and oils or fats, further mixing the resulting mixture with a powdery raw material rich in carbohydrate and/or proteins to give a powdery and/or dough-like mixture, which preferably comprises, as expressed in terms of part by weight, 5 to 95 parts of carbohydrate, up to 40 parts of proteins and up to 80 parts of oils or fats, and then converting the mixture into granules with supplemental use of steam and/or an aqueous solution of maltodextrin, gum or starch. The product prepared by this method has a high content of components other than proteins and the method is not particularly developed for the granulation of soybean proteins.

As has been discussed above, the soybean protein products prepared according to the foregoing methods are insufficient for use as protein-supply foods and there is still room for improvement.

Japanese Un-Examined Patent Publication No. Hei 6-166622 discloses a food obtained by preferably incorporating hardly digestible dextrin into a food having a high content of sugar or a sugar-containing preparation granulated using hardly digestible dextrin. This patent also discloses that the sugar-containing preparation comprising the hardly digestible dextrin is effective for preventing obesity or abnormality of glucose tolerance and excellent in flowability and storability and therefore, it can easily be used in not only food industries, but also general families.

SUMMARY OF THE INVENTION

It is accordingly an object of the present invention to provide easily dispersible soybean protein, which can uniformly be dispersed in a liquid within a short period of time and which gives a liquid dispersion free of any rough feeling to the tongue, having good ability of passing through the throat, and also free of any unpleasant taste and texture such as the smell of soybean, harsh taste, bitter taste and astringency, upon drinking the same, as well as a method for preparing the easily dispersible soybean protein.

The inventors of this invention have conducted various studies to solve the foregoing problems associated with the conventional techniques, have found that the foregoing problems can efficiently be eliminated by coating powdery soybean proteins with an aqueous solution of carbohydrate, and in particular saccharides, which are not readily digestible, and then granulating the coated proteins.

Accordingly, the present invention relates to easily dispersible soybean protein granules, which comprise powdery soybean protein whose surface is coated with such a carbohydrate, wherein the carbohydrate is present in an amount of at least 5 parts by weight per 100 parts by weight of the powdery soybean protein. The present invention also provides an easily dispersible soybean protein granule wherein the coating of the not readily digestible carbohydrate further comprises lecithin.

The present invention also provides a method for preparing an easily dispersible granule of soybean protein, which comprises the step of granulating powdery soybean protein while the powder is sprayed with an aqueous solution containing a carbohydrate which is not readily digestible, characterized by using at least 5 parts by weight of the carbohydrate per 100 parts by weight of the powdery soybean protein. The present invention likewise provides the foregoing preparation method wherein the aqueous solution containing the carbohydrate further comprises lecithin per 100 parts by weight of the powdery soybean protein. The present invention further provides the foregoing preparation method wherein the granulation is fluidized bed-granulation. In an alternative embodiment, the present invention also provides a method for preparing the easily dispersible granule of soybean protein in which a dry blend comprising soybean protein and a not readily digestible carbohydrate is prepared, and is then sprayed with lecithin in water to produce a lecithin-coated soybean protein carbohydrate blend. The water is then removed from the lecithin-coated soybean protein/carbohydrate blend by drying. Other components, including nutraceutical components such as sterols, steryl esters, stanols, stanol esters, isoflavones, vitamins, minerals, and the like, can be combined with the protein/carbohydrate/lecithin blend to further supplement the nutritive value of the product.

The easily dispersible soybean protein granule of the present invention possesses the following characteristic properties:

1. It can be dispersed in usual liquids for drinking such as water, milk, sour milk beverages and fruit juice drinks, without forming so-called "DAMA."
2. It can be dispersed in the foregoing liquids within a short period of time.
3. Even if one keeps the dispersion in his mouth immediately after the preparation thereof, it does not have rough feeling to the tongue and easily passes through the throat.

4. It can eliminate any unpleasant taste such as the smell of soybean, harsh taste, bitter taste and astringency upon drinking the resulting dispersion.

As has been described above, the easily dispersible soybean protein according to the present invention is easily dispersed in a liquid and the resulting liquid dispersion is quite easily drinkable. Therefore, the soybean protein can favorably be used in particular as protein-supply foods.

DETAILED DESCRIPTION OF THE INVENTION

The easily dispersible soybean protein granules and the method for the preparation thereof according to the present invention will hereunder be described in more detail.

The easily dispersible soybean protein granule of the present invention is one comprising powdery soybean protein, the surface of which is coated with a carbohydrate which is not readily digestible, and comprises the carbohydrate in an amount of at least 5 parts by weight and more preferably at least 9 parts by weight per 100 parts by weight of the powdery soybean protein.

The easily dispersible soybean protein granule of the present invention can be prepared by using at least 5 parts by weight and more preferably at least 9 parts by weight of carbohydrate or saccharides per 100 parts by weight of powdery soybean protein, and granulating the powdery soybean protein while spraying the soybean protein with an aqueous solution containing the carbohydrate. As a result, the easily dispersible soybean protein granule has a structure comprising soybean protein powder whose surface is coated with the carbohydrate. In this connection, it is important to use the carbohydrate in the form of an aqueous solution and to bring the powder into close contact with the aqueous solution. More specifically, the easily dispersible soybean protein granule of the present invention can be prepared by stirring and fluidizing powdery soybean protein according to an appropriate method, spraying the stirred and fluidized powdery soybean protein with the carbohydrate in the form of an aqueous solution, followed by appropriately drying the spray-coated soybean protein powder after the spraying step or simultaneous with the spraying operation to thus coat the surface of the soybean protein powder with the carbohydrate and to simultaneously granulate the soybean protein.

Such granulation of the soybean protein may be performed using a method such as those used for granulation in the fields of foods and medicine, stirring granulation, extrusion granulation and fluidized-bed granulation. Among these, the fluidized-bed granulation technique is more preferred as compared with other methods. This is because the former permits the simultaneous execution of the spraying of the aqueous solution, granulation and drying and thus, the rate of penetration of the carbohydrate into the interior of the soybean protein is low. This results in a structure in which the surface of the soybean protein is coated with the carbohydrate.

Specific examples of the fluidizing devices usable in the granulation of the present invention are fluidized-bed granulation devices such as batch-wide fluidized-bed devices, jet fluidized-bed devices and jet fluidized-bed granulation devices (Granulation Handbook, 1991, pp. 295–303).

The temperature of warmed air (suction air) used in the fluidized-bed granulation is adjusted to the range of from 30 to 100° C. and preferably 50 to 80° C., while the temperature of the raw materials during the granulation is controlled to the range of from 25 to 70° C. and preferably about 30 to 50° C. This is because if the temperature is too high, it is difficult to carry out granulation, while if it is too low, it is difficult to fluidize the raw materials.

The spraying speed during the granulation step may vary depending on the kinds of the fluidized-bed devices selected and the flow rate of the solution is usually controlled to a level of about 0.5 to 4 1/min, but it is not restricted to any specific level.

The drying step may be carried out simultaneous with the fluidization or may be a step subsequent to the fluidization step. When the drying is performed simultaneously with the fluidization, the drying temperature preferably ranges from 30 to 50° C. On the other hand, if the drying is carried out after the spraying step, the drying is preferably carried out at a temperature ranging from 50 to 70° C.

After completion of the drying, the resulting granules are passed through a sieve, for instance, to make the particle size uniform and then packaged. The granules come in contact with the air during the classification step to thus air-cool the same and therefore, the granules are not necessarily forced to cool. However, cooled air is, if necessary, passed through the granules to thus reduce the temperature of the granules to about 30 to 50° C., depending on the packaging materials used.

As has been described above, the easily dispersible soybean protein granule of the present invention comprises soybean protein having such properties that it is easily drinkable after dispersing it in a liquid. In this respect, such properties relate to, in particular, the amount of the carbohydrate relative to that of the powdery soybean protein. The soybean protein granule of the present invention must comprise at least 5 parts by weight and more preferably at least 9 parts by weight of the carbohydrate per 100 parts by weight of the powdery soybean protein. The effect of the addition of the carbohydrate is not changed even if it is used in a considerably large amount and, therefore, the upper limit thereof is not necessarily critical. For example, it may in general be used in an amount of up to 100 parts by weight. However, the soybean protein granule is used as a protein-supply food, the amount of the carbohydrate is preferably not more than 30 parts by weight and more preferably not more than 15 parts by weight so that the content of the soybean protein in the granule is not substantially reduced.

In addition, the carbohydrate not readily digestible, is used for coating the powdery soybean protein in the form of an aqueous solution having a concentration preferably ranging from 5 to 50% by mass and more preferably 8 to 30% by mass. If the concentration of the aqueous solution is less than 5% by mass, a large amount of the liquid to be sprayed is required and this in turn reduces the production efficiency. On the other hand, if the concentration exceeds 50% by mass, there would be such a tendency that the granulation of the soybean protein powder is impaired.

In this respect, it is sufficient to use the carbohydrate in the granulation step in an amount of at least 5 parts by weight and more preferably at least 9 parts by weight per 100 parts by weight of the powdery soybean protein. Moreover, one skilled in the art would recognize that it would be appropriate to adjust the content of the carbohydrate in the resulting granule by changing the other granulation conditions and thus, the upper limit of the amount of the carbohydrate used in the granulation step is not necessarily fixed.

The amount of carbohydrate used in the present invention is higher than that required for using the same as a simple binder and accordingly, the amount of the aqueous solution to be added is also increased. However, such an amount of the carbohydrate is required for forming a film on the surface of the powdery soybean protein to thus ensure the effect of the present invention. In this connection, whether the surface of the powdery soybean protein is properly coated with the carbohydrate can be examined or detected by staining the granules with an iodine solution.

The soybean protein used in the present invention may be a powdery soybean protein product prepared from defatted soybean by a variety of art-recognized methods, which can increase the protein content. Specific examples thereof include extracted protein having a soybean protein content ranging from 50 to 60% by mass, concentrated soybean protein having a soybean protein content ranging from 60 to 70% by mass, and isolated soybean protein having a soybean protein content of not less than 90% by mass. Among them, preferred are isolated soybean protein products because of their high soybean protein contents. Alternatively, it is also possible to use the foregoing soybean protein products slightly hydrolyzed to such an extent that they do not have extreme bitterness and rough taste. In cases where such hydrolyzed soybean protein is used, the viscosity of a solution of the product obtained after the granulation can be controlled. As a result, this is quite preferred since the resulting easily dispersible soybean protein can be dispersed in a liquid in a high concentration.

Regarding the particle size of the soybean protein, preferably used herein are those comprising fine particles in a high rate and it is desirable in the present invention to use those in which the rate of particles capable of passing through a sieve of 100 mesh exceeds 90% by mass.

The term "not readily digestible carbohydrate or saccharides" used herein means those having a content of "not readily digestible components" of not less than 30% by mass, as determined by the method defined below. The phrases "not readily digestible" and "hardly digestible" are used interchangeably herein.

Method for Quantitative Analysis of Not Readily Digestible Components

A not readily digestible carbohydrate sample (1 g) was accurately weighed out, followed by addition of 50 ml of a 0.05M phosphate buffer (pH 6.0), then 0.1 ml of alpha-amylase (Termamil 120 L, titer: 120 KNU/g, available from Novo Nordisk Bio-industry Company), and carrying out a reaction at 95° C. for 30 minutes. After cooling the reaction system, the pH value thereof is adjusted to 4.5, followed by addition of 0.1 ml of amyloglucosidase (No. A-3042, titer: 6100 U/ml, available from Sigma Company), reacting them at 60° C. for 30 minutes and then raising the temperature of the reaction system up to 90° C. thus terminate the reaction. After the completion of the reaction, the reaction solution is filled up to 100 ml with water, determination of the amount of glucose (B) (g) by the pyranose-oxidase method (Starch Science, Vol. 37, No. 2, p. 107), determination of the amount of glucose (A) (g) prior to the reaction to thus calculate the content of the hardly digestible components (%) according to the following equation:

Content Not Readily Digestible Components (%)=[1−A−(B−A)× 0.9]×100

(In this equation, A represents the amount (g) of glucose prior to the reaction and B represents the amount (g) of glucose after completion of the reaction).

For example, the not readily carbohydrate used in the present invention can be prepared by treating roasted dextrin with alpha-amylase, or treating the roasted dextrin with, for instance, a variety of enzymes subsequent to the treatment with alpha-amylase, and then subjecting, if necessary, the treated dextrin to a treatment such as fractionation, an ion-exchange resin chromatography treatment and/or a purification treatment. In other words, the process for preparing the not readily digestible carbohydrate comprises a step for preparing roasted dextrin as an intermediate and a step for producing the carbohydrate product starting from the resulting roasted dextrin. In this respect, the starch serving as a raw material for the roasted dextrin and used as a starting material for the carbohydrate is not restricted to any specific one and may be, for instance, potato starch, corn starch, waxy corn starch, tapioca starch, wheat starch and rice starch. The method for preparing the not readily digestible carbohydrate will hereunder be described in more detail.

The roasted dextrin can be prepared by adding, to starch, a mineral acid (such as hydrochloric acid, nitric acid, sulfuric acid) and preferably hydrochloric acid, for instance, a 1% by mass aqueous hydrochloric acid solution, in an amount ranging from 3 to 10% by mass per 100 parts by weight of the starch and then heat-treating the resulting mixture. Prior to the heat-treatment, it is preferred that the mixture of the starch and the aqueous mineral acid solution be stirred in an appropriate mixer in order to uniformly admix the mixture and then ripened (over several hours), followed by pre-drying of the mixture preferably at a temperature ranging from about 100 to 120° C. to thus reduce the moisture present in the mixture down to about 5% by mass. The heat-treatment is suitably carried out at 150 to 200° C. to 10 to 120 minutes, preferably 30 to 120 minutes. The higher the temperature of the heat-treatment, the higher the content of the not readily digestible component present in the target product. However, if using a temperature of not less than 180° C., there is a tendency of forming a colored substance and therefore, the temperature for the heat-treatment is more preferably 150 to 180° C.

It is also possible to carry out the reaction at a high temperature for a shorter period of time by appropriately selecting a heating device to be used. For instance, a device in which a uniform reaction can be carried out within a short period of time such as an extruder may be used to ensure the efficient heat-treatment. Such a method, which makes use of an extruder, is disclosed in Japanese Un-Examined Patent Publication No. Hei 06-80701.

The not readily digestible carbohydrate is prepared from the roasted dextrin prepared according to the foregoing method. More specifically, the roasted dextrin is dissolved in water to give an aqueous solution having a concentration ranging from about 20 to 45% by mass, followed by adjustment of the pH of the roasted dextrin aqueous solution to the range of from 5.5 to 6.5, and treatment of alpha-amylase such as Tarmamil 60L (trade name, available from Novo Nordisk Bio-industry Company) with roasted dextrin alpha-amylase. This alpha-amylase is added to the roasted dextrin in an amount ranging from 0.05 to 0.2% by mass based on the amount of the dextrin. In case where other alpha-amylases are used, an equivalent amount of each enzyme is added thereto, while taking into consideration the titer of each enzyme. After the addition of alpha-amylase, the solution is heated to carry out the hydrolysis at the working temperature of the alpha-amylase ranging from 85 to 100° C. (the working temperature may vary depending on the kinds of alpha-amylases) for a time ranging from 30 minutes to 2 hours. Then the temperature is raised up to about 120° C. (the deactivation temperature of the alpha-amylase) to thus interrupt the effect of the alpha-amylase. At this stage, it is also possible to reduce the pH value to a level at which the alpha-amylase undergoes deactivation, i.e., to a pH of about 4 by the addition of an acid such as hydrochloric acid or oxalic acid.

In case where the reaction product is purified after the completion of the treatment with the alpha-amylase, activated carbon is added thereto in order to remove any impurity and undesirable color. Subsequently, the reaction product is filtered through the usual filter-press or a pre-coat filter. Then the reaction product is treated with an ion-exchange resin to remove salts and colored substances present in the solution. The treatment with an ion-exchange resin is desirably carried out by the use of a cation-exchange resin, an anion-exchange resin and subsequently by passing through a mixed resin comprising cation- and anion-exchange resins. This method permits the preparation of a carbohydrate which is not readily digestible containing about 30 to 85% by mass of hardly digestible components depending on the kind of roasted dextrin.

After the treatment with alpha-amylase, the roasted dextrin may further be treated with other enzymes. When the enzyme treatment is a treatment with glucoamylase, this enzyme treatment may be carried out under condition of the usual glucoamylase treatment. For instance, the temperature of the reaction solution is reduced to 55 to 60° C., the pH value thereof is adjusted to about 4.0 to 6.0, commercially available glucoamylase is added to the roasted dextrin in an amount of about 0.05% by mass based on the weight of the dextrin and the dextrin is hydrolyzed for about 24 to 48 hours, while maintaining the foregoing temperature of the reaction solution. In this reaction, the digestible components such as oligosaccharides present in the solution are decomposed into glucose. The added amount and working time of glucoamylase are not restricted to the foregoing ranges and it is sufficient to add the same in an equivalent amount depending on the titer of the amylase. In addition, the reaction time may arbitrarily be controlled by increasing or reducing the amount of the enzyme to be added. Subsequently, the reaction system is heated to a temperature of about 80° C. to thus terminate the hydrolysis. Then the resulting product is if necessary purified according to the method identical to that described above. The product obtained by this preparation method contains glucose in addition to the not readily digestible components.

In this connection, a small amount of alpha-amylase coexists in the usual glucoamylase and therefore, an effect can be expected, which is approximately similar to that achieved by the simultaneous use of alpha-amylase and glucoamylase. However, the effect of alpha-amylase may often be lowered depending on the amount of the coexisting alpha-amylase and therefore, it is preferred to treat the roasted dextrin with alpha-amylase and subsequently with glucoamylase.

In most of cases, the glucoamylase treatment does not directly increase the content of the hardly digestible components, but the treatment converts digestible components such as oligosaccharides into glucose and the resulting glucose component is separated and removed by, for instance, ion-exchange resin chromatography to thus increase the content of the not readily digestible components. The ion-exchange resin chromatography is a technique for removing glucose by passing through an ion-exchange resin for separation, a solution obtained by treating the roasted dextrin with glucoamylase, decoloring and filtering the resulting solution and then purifying it with an ion-exchange resin. Examples of ion-exchange resins usable herein are commercially available usual strongly acidic cation exchange resins such as Amberlite IR-110, Amberlite IR-118, Amberlite IR-120 (trade names of the products available from Organo Company), Diaion 2K-110, Diaion SKK-102 (trade names of the products available from Asahi Chemical Industry Co., Ltd.). The flow rate upon passing the solution through the column is preferably controlled depending on the specific resin used, but the solution is fed to the column at an SV ranging from 0.1 to 0.6, preferably 0.2 to 0.4 and a temperature ranging from 20 to 70° C., preferably 50 to 70° C. This separation treatment can increase the content of the hardly digestible components to not less than about 80% by mass and preferably 85 to 95% by mass or higher and can reduce the glucose content to about 0.5% by mass.

The not readily digestible carbohydrate may include the not readily digestible dextrin prepared by the foregoing method and not readily digestible starch syrup as well as reduced products thereof. Examples of the not readily digestible carbohydrates commercially available are Pine Fiber (trade name of not readily digestible dextrin available from Matsutani Industry Co., Ltd., content of hardly digestible components: 50 to 60% by mass), Fibersol 2 (trade name of hardly digestible dextrin available from Matsutani Industry Co., Ltd., content of hardly digestible components: 85 to 95% by mass), and Fibersol 2H (trade name of reduced, hardly digestible dextrin available from Matsutani Industry Co., Ltd., content of hardly digestible components: not less than 85% by mass). Alternate forms of the not readily digestible carbohydrate include, but are not necessarily limited to, beta-glucan, inulin, hemicellulose, and the like.

The soybean protein granules prepared by the foregoing granulation method would effectively allow the achievement of the intended effect. However, it is preferred that the granulation be carried out using an aqueous solution of the carbohydrate to which lecithin is added. This is because the resulting dispersion may smoothly pass through the throat upon drinking. In this respect, the added amount of lecithin preferably ranges from 0.4 to 2.0 parts by weight per 100 parts by weight of the powdery soybean protein.

If lecithin is added to the aqueous solution in an amount of less than 0.4 part by weight per 100 parts by weight of the powdery soybean protein, the foregoing effect is almost identical to that observed when lecithin is not used. On the other hand, if the amount of lecithin exceeds 2.0 parts by weight, the time required for dispersing lecithin in the aqueous solution of the carbohydrate is increased and/or the content of the soybean protein is reduced. For this reason, the upper limit of lecithin is desirably set at this level.

Lecithin used in the present invention may be any one commonly used as additives for foods such as soybean lecithin or yolk lecithin, but he soybean lecithin is more preferably used since it is less expensive and has good compatibility to the soybean protein. Among the soybean lecithin products, crude lecithin has a high content of fats and oils or the like and has smells and tastes peculiar thereto and is not easily formed into a paste-like or plastic-like state. On the other hand, purified lecithin and enzyme-treated lecithin are more preferably used in the present invention, since they are in powdery states, can easily be handled and are excellent in dispersibility and solubility in water.

The easily dispersible soybean protein granule of the present invention is a protein-supply food prepared using a not readily digestible carbohydrate and lecithin in a ratio specified above. It is also possible to arbitrarily increase the amount of the carbohydrate used up to a level almost equal to that of the powdery soybean protein. This would permit the enhancement of a variety of physiological functions which may be attributable to the carbohydrate, such as the reduction of cholesterol, the inhibition of insulin secretion, the inhibition of any increase in the blood-sugar level, the intestinal function-controlling action, the prevention of carcinoma of large intestine, heart diseases and cerebral apoplexy and the inhibition of the excretion of harmful substances. In this regard, it is desirable to spray the powdery soybean protein with the hardly digestible carbohydrate in the form of an aqueous solution containing about 15 parts by weight per 100 parts by weight of the powdery soybean protein and to preliminarily mix the remaining carbohydrate with the powdery soybean protein. As has been described above, if the rate of the hardly digestible carbohydrate to be added in the form of an aqueous solution is increased, the time required for passing the solution through a column and that required for drying the resulting granular product are increased.

Moreover, it is also possible to incorporate, into the easily dispersible soybean protein granule of the present invention, trace components such as vitamins and minerals, which are components effective for the human body. In this respect, vitamins and minerals insoluble in water are preliminarily mixed with the powdery soybean protein and then the resulting mixture is sprayed with an aqueous solution containing the not readily digestible carbohydrate. On the other hand, vitamins and minerals soluble in water may be dissolved in an aqueous solution of the carbohydrate and then sprayed on the powdery soybean protein. Alternatively, an aqueous solution of these trace components is separately sprayed on the powdery soybean protein prior to or after the spray of the aqueous solution of the carbohydrate to thus carry out the granulation.

The term "easily dispersible soybean protein granule" used herein means a soybean protein granule capable of being uniformly dispersed in the usual liquid for drinking such as water, milk, sour milk beverages and fruit juice drinks within a short period of time, for instance, within about 10 seconds and more preferably within about 5 seconds.

Examples of liquid in which the easily dispersible soybean protein granule of the present invention is dispersed are water, milk, sour milk beverages and fruit juice drinks, but the present invention is not restricted to these specific examples. The amount of the easily dispersible soybean protein granule of the present invention to be added to the liquid is not restricted to any specific range, but the best effect of the resent invention can be expected when the amount thereof in general ranges from about 50 to 150 g/l.

Now, an example of the method for preparing the easily dispersible soybean protein granule, which makes use of a fluidized bed, will be given below in order to more specifically describe the present invention.

The powdery soybean protein is introduced into a fluidized bed granulation device and an aqueous solution containing 5 to 50% by mass, preferably 8 to 30% by mass of not readily carbohydrate is sprayed on the powdery soybean protein till the amount of the carbohydrate is at least 5 parts by weight per 100 parts by weight of the powdery soybean protein, while the powdery soybean protein is fluidized by injecting warmed air maintained at a temperature of about 50 to 80° C. It is more preferred that lecithin be dispersed in the aqueous solution in an amount ranging from 0.4 to 2 parts by weight per 100 parts by weight of the powdery soybean protein. In addition, minerals such as iron and calcium salts in the form of powder may if necessary be admixed with the powdery soybean protein in advance or they may be dissolved or dispersed in the aqueous solution containing the hardly digestible carbohydrate.

After spraying all of the aqueous solution, the soybean protein thus sprayed is dried till the temperature of the product reaches about 50 to 60° C., then cooled by supplying cold air maintained at 20 to 30° C. till the temperature of the product is reduced to 35 to 45° C. to thus complete the granulation and drying steps. The spraying temperature and the spraying speed are controlled in such a manner that the particle size of the product ranges from about 90 to 500 $\mu$m and preferably 120 to 350 $\mu$m.

The resulting easily dispersible soybean protein granule can rapidly be dispersed in a liquid such as water and milk. The resulting dispersion does not provide any rough feeling to the tongue or mouth, easily passes through the throat upon drinking it without any pre-treatment and one can drink the same without any trouble and unpleasant feeling, as though they were drinking the liquid per se.

In an alternative embodiment of the present invention, the easily dispersible soybean protein granule of the invention can be produced by forming a dry blend of the soy protein with a selected not readily digestible carbohydrate. The ratio of not readily digestible carbohydrate to soy protein can range from about 0.1:10 to about 10:10. A preferred range is from about 0.5:10 to about 1.5:10. In this embodiment, the dry blend is then sprayed with a mix of lecithin and water, in a range of from about 1% lecithin in water to about 10%, and in a preferred range of from about 3% lecithin in water to about 5%, using agglomeration techniques that are conventional in the art. The lecithin/water blend is then added to the dry blend so that the ratio of lecithin to dry blend is from about 0.1:100 to about 2.0:100. A more preferred ratio of lecithin to dry blend is form about 0.5:100 to about 1.5:100. The water is then removed by heating the resulting blend so that the water is removed but the volubility of the soy protein is not decreased. Those of ordinary skill in the art will recognize that the temperature or temperatures at which this drying process is carried out, and the duration of the drying process, will vary depending upon the amount of water used, the amount of material being dried, and the like. The resultant dried product is readily dispersed in water with stirring, and the product produces a beverage that is smooth and free of lumps. The high solubility of the protein is confirmed as there is only a slight reduction in Nitrogen Solubility Index in the product.

The present invention will hereunder be described in more detail with reference to the following Examples. In these Examples, "part" means "part by weight" unless otherwise specified.

EXAMPLE 1

To a small-sized fluidized bed device (a granulation device for laboratories Model 20L available from Ogawara Manufacturing Company), there was added 100 parts of ProFam 891 (trade name of isolated soybean protein available from ADM Company, particle size: not less than 90% by mass of 100 mesh pass). Then the powdery soybean protein was sprayed with a solution prepared by adding hardly digestible carbohydrate and lecithin in a ratio specified in the following Table 1 to 100 parts of water, while fluidizing the soybean protein using warmed air of 65° C. to thus granulate the soybean protein.

The carbohydrate used in this Example was Fibersol 2 (trade name of hardly digestible dextrin available from Matsutani Chemical Industry Co., Ltd., content of hardly digestible components: about 90% by mass). Lecithin used herein was Ultralec P (trade name of purified soybean lecithin available from ADM Company, content of acetone insolubles: not less than 97%). The solution for spraying was prepared by dissolving the carbohydrate in water and then dispersing lecithin in the resulting aqueous solution.

Separately, the same procedures used above were repeated except that Pinedex #2 (trade name of maltodextrin available from Matsutani Chemical Industry Co., Ltd., content hardly digestible components: about 3%) was substituted for the hardly digestible carbohydrate, as Comparative Example, to granulate the soybean protein.

After all of the solution was sprayed on the soybean protein, the sprayed soybean protein was dried until the temperature thereof reached 55° C., then cooled by supplying cold air of 25° C. until the temperature of the soybean protein reduced to 40° C. to thus complete the granulation and drying steps. As a result, granulated products shown in Table 1 (Sample 1 to Sample 8) were obtained.

Moreover, 100 parts of ProFam 891 and 10 parts of Fibersol 2 were mixed together in their powdery state, the resulting powdery mixture was introduced into a fluidized bed to thus fluidize it, a lecithin dispersion prepared by dispersing one part of Ultralec P in 100 parts of water was sprayed on the fluidized mixture in the same manner used above to granulate the mixture and to thus give a granulated product or Sample 9.

The dispersibility of the granulated products and the conditions of the resulting dispersions upon drinking were evaluated according to the following evaluation criteria. The results thus obtained are summarized in the following Table 2.

Dispersibility: To a 300 ml volume beaker, there were added 200 ml of water of 20° C. and then 10 g of each sample at a time, then the resulting mixture was stirred with a spoon to observe the dispersed state of the sample.
  *: The sample was dispersed by stirring for 5 seconds.
  ¤: The sample was dispersed by stirring for 10 seconds.
  ‡: When stirring for 10 seconds, DAMA was partially formed.
  X: When stirring for 10 seconds, a considerable amount of DAMA was formed.
Palatability: To a 300 ml volume beaker, there were added 200 ml of water of 20° C. and then 10 g of each sample at a time, then the resulting mixture was stirred with a spoon for 10 seconds and the feeling to the tongue or mouth upon including the resulting dispersion in the mouth was evaluated.
  *: Quite smooth
  ¤: Smooth
  ‡: There was observed rough feeling to the mouth
  X: There was observed considerable rough feeling to the mouth
Ability of Passing Through the Throat: Each sample was dispersed in the same manner used for the evaluation of "Palatability," followed by drinking the resulting dispersion as such to thus evaluate the ability of the same to pass through the throat.
  *: The dispersion easily passed through the throat and thus it was never accompanied by any trouble upon drinking.
  ¤: The dispersion exhibited powdery feeling to some extent, but was drinkable without any problem.
  ‡: The dispersion exhibited powdery feeling and one would be reluctant to swallow the dispersion.
  X: The dispersion showed considerable powdery feeling and it was difficult to easily swallow the same.
Taste and Texture: Each sample was dispersed in the same manner used for the evaluation of "Palatability," followed by comparison of the taste and texture observed upon drinking with that of milk.
  *: The taste and texture were almost identical to those observed for milk and one was never reluctant to swallow the same.
  ¤: The taste and texture were approximately identical to those observed for milk and one was never reluctant to swallow the same.
  ‡: The dispersion slightly had unpleasant tastes such as bitterness, harsh taste and astringency, which were not observed for milk and one would be reluctant to swallow the dispersion.
  X: The dispersion considerably had unpleasant tastes such as bitterness, harsh taste and astringency, which were not observed for milk and one would be quite reluctant to swallow the dispersion.

TABLE 1

| Sample No. | Kind & Amt. of Carbohydrate | | Amt. of Lecithin |
|---|---|---|---|
| Sample 1 | — | — | — |
| Sample 2 | Fibersol 2 | 6 parts | — |
| Sample 3 | Fibersol 2 | 10 parts | — |
| Sample 4 | Fibersol 2 | 10 parts | 0.5 part |
| Sample 5 | Fibersol 2 | 10 parts | 1.7 part |
| Sample 6 | Fibersol 2 | 13 parts | — |
| Sample 7 | Pinedex #2 | 10 parts | — |
| Sample 8 | Fibersol 2 | 2 parts | — |

TABLE 2

| | Granule | Dispersibility | Palatability | Ability of passing through the throat | Taste & Texture |
|---|---|---|---|---|---|
| Control | Sample 1 | X | X | X | X |
| Example | Sample 2 | ¤ | ¤ | ¤ | ¤ |
| Example | Sample 3 | ¤ | * | ¤ | * |
| Example | Sample 4 | * | * | * | * |
| Example | Sample 5 | * | * | * | * |
| Example | Sample 6 | ¤ | * | ¤ | * |
| Comp. Ex. | Sample 7 | ¤ | ‡ | ‡ | X |
| Comp. Ex. | Sample 8 | ‡ | ‡ | ‡ | ‡ |
| Comp. Ex. | Sample 9 | ‡ | ‡ | ‡ | ¤ |

EXAMPLE 2

The procedures used in Example 1 were repeated except that juice was substituted for the milk used in Example 1 to evaluate the soybean protein granule. As a result, there were observed results approximately identical to those obtained in Example 1.

EXAMPLE 3

ProFam 891 (100 parts) was fluidized and the fluidized ProFam 891 was sprayed with a solution prepared by adding, to 100 parts of water, 12 parts of Fibersol 2H (trade name of reduced hardly digestible dextrin available from Matsutani Chemical Industry Co., Ltd., content of hardly digestible components: 88% by mass) and 0.8 part of Ultralec P (lecithin) to thus granulate the ProFam 891 according to the method used in Example 1.

The resulting soybean protein granule was evaluated according to Example 1 and as a result, it was found that the granule showed approximately the same results observed for the granule prepared using Fibersol 2 and lecithin in Example 1.

EXAMPLE 4

ProFam 891 (100 parts) and calcium lactate pentahydrate (3 parts) were mixed together in their powdery state, the resulting mixture was introduced into a fluidized bed to thus fluidize the same. Then the fluidized mixture was sprayed with a solution prepared by adding, to 100 parts of water, 8 parts of Fibersol 2 and 1.2 part of Ultralec P in an amount of ⅔ time the total volume of the solution prepared and the spraying was once interrupted. To the remaining solution, there were added 0.005 part of vitamin B1, 0.006 part of vitamin B2 and 0.012 part of vitamin B12 and then the spraying operation was again initiated. The granulation was performed according to the method used in Example 1, except that the spraying operation was once interrupted.

EXAMPLE 5

Five thousand pounds of soy protein isolate was dry blended with 500 pounds of a not readily digestible carbohydrate; in this instance, Fibersol. A de-oiled lecithin was added to water (50 pounds lecithin in 1300 pounds of water). The lecithin/water blend was then sprayed onto the dry blend of soy protein isolate/Fibersol using techniques conventional in the agglomeration industry. The water was then removed by heating the resulting blend enough to remove the water but not so as to reduce the solubility of the soy protein. As those of skill in the art will recognize, the length of time needed for this step and the temperature at which the material is heated, will vary depending upon the amount of water used, the amount of material to be dried, and the like. In this instance, the material was dried in three stages over a total time of about 30 minutes. The first stage was at about 132–138☐ C., the second at about 135–141° C., and the third at about 87–94° C. As stated, the total dry time for the material in this instance was about 30 minutes, with approximately 10 minutes at each of the foregoing temperature ranges.

Ten grams of the dried blend were added to 200 gm. of water in a glass, and stirred. The resulting beverage was free of lumps and was smooth to drink. The Nitrogen Solubility Index was reduced no more than 10%.

The resulting soybean protein granule was evaluated according to Example 1 and as a result, it was found that the granule showed approximately the same results observed for the granule prepared by spraying a solution of Fibersol 2 and lecithin in Example 1.

The easily dispersible soybean protein granule according to the present invention shows the following effects:

1. It can be dispersed in usual liquids for drinking such as water, milk, sour milk beverages and fruit juice drinks, without forming so-called "DAMA."
2. It can be dispersed in the foregoing liquids within a short period of time.
3. Even if one keeps the dispersion in his mouth immediately after the preparation thereof, it does not have rough feeling to the tongue and easily passes through the throat.
4. It can eliminate any unpleasant taste such as the smell of soybean, harsh taste, bitter taste and astringency upon drinking the resulting dispersion.

What is claimed is:

1. A method for preparing a dispersible granule of soybean protein, dispersible in drinking liquids without forming DAMA, said method comprising preparing a dry blend comprising soybean protein isolate and a not readily digestible carbohydrate, spraying the dry blend with lecithin in water to produce a lecithin-coated soybean protein/carbohydrate blend, and removing the water from the lecithin-coated soybean protein/carbohydrate blend.

2. The method of claim 1 wherein the not readily digestible carbohydrate is 85% hardly digestible dextrin.

3. The method of claim 1 further comprising the addition of a nutraceutical component.

4. The method of claim 3 wherein the nutraceutical is a component selected from the group consisting of sterols, stanols, steryl esters, stanol esters, vitamins, minerals, and isoflavones.

* * * * *